(12) United States Patent
Chew et al.

(10) Patent No.: US 10,532,318 B2
(45) Date of Patent: Jan. 14, 2020

(54) METHOD AND SYSTEM FOR APPLYING SUPERIMPOSED TIME-VARYING FREQUENCY ELECTROMAGNETIC WAVE FOR MARINE BALLAST WATER BIO-FOULING CONTROL

(71) Applicant: SEMB-ECO R&D PTE LTD, Singapore (SG)

(72) Inventors: Hwee Hong Chew, Singapore (SG); Poh Kwee Ong, Singapore (SG)

(73) Assignee: Semb-Eco R&D PTE LTD, Singapore (SG)

( * ) Notice: Subject to any disclaimer, the term of this patent is extended or adjusted under 35 U.S.C. 154(b) by 168 days.

(21) Appl. No.: 15/748,484

(22) PCT Filed: Jul. 28, 2016

(86) PCT No.: PCT/SG2016/050358
§ 371 (c)(1),
(2) Date: Jan. 29, 2018

(87) PCT Pub. No.: WO2017/018942
PCT Pub. Date: Feb. 2, 2017

(65) Prior Publication Data
US 2018/0201526 A1 Jul. 19, 2018

(30) Foreign Application Priority Data
Jul. 29, 2015 (WO) ............... PCT/SG2015/050239

(51) Int. Cl.
*C02F 1/30* (2006.01)
*C02F 1/46* (2006.01)
(Continued)

(52) U.S. Cl.
CPC ......... *B01D 53/965* (2013.01); *B01D 53/507* (2013.01); *B01D 53/56* (2013.01);
(Continued)

(58) Field of Classification Search
CPC .................. C02F 1/30–325; C02F 2103/008
See application file for complete search history.

(56) References Cited

U.S. PATENT DOCUMENTS

| 4,865,748 A | 9/1989 | Morse |
| 7,695,675 B2* | 4/2010 | Kaiser ............... A23L 3/28 210/319 |

(Continued)

FOREIGN PATENT DOCUMENTS

| CN | 1460647 A | 12/2003 |
| CN | 1898163 A | 1/2007 |

(Continued)

OTHER PUBLICATIONS

International Search Report and Written Opinion, issued in the corresponding PCT application serial No. PCT/SG2016/050358, dated Nov. 25, 2016, 8 pages.

*Primary Examiner* — Steven A. Friday
(74) *Attorney, Agent, or Firm* — Cesari & McKenna LLP

(57) ABSTRACT

The disclosure relates to a method and system for treating ballast water and ballast water treatment systems in order for treatment effects to be carried out, such as controlling the transportation of undesirable and invasive marine organisms. In particular, the disclosure relates to methods and systems for applying a superimposed time-varying frequency electromagnetic wave comprising both AC and DC components in a pulsating manner to ballast water within a ballast water treatment system.

20 Claims, 10 Drawing Sheets

(51) Int. Cl.
- *C02F 1/32* (2006.01)
- *B01D 53/96* (2006.01)
- *B01D 53/78* (2006.01)
- *C02F 1/00* (2006.01)
- *C02F 1/48* (2006.01)
- *C02F 1/461* (2006.01)
- *C25D 11/00* (2006.01)
- *C25D 11/02* (2006.01)
- *C25D 11/34* (2006.01)
- *C25D 11/38* (2006.01)
- *B01D 53/50* (2006.01)
- *B01D 53/56* (2006.01)
- *B01D 53/62* (2006.01)
- *C02F 5/00* (2006.01)
- *C23F 13/04* (2006.01)
- *C23F 13/06* (2006.01)
- *C02F 103/00* (2006.01)
- *C02F 103/08* (2006.01)
- *C02F 103/18* (2006.01)

(52) U.S. Cl.
CPC ............ *B01D 53/62* (2013.01); *B01D 53/78* (2013.01); *C02F 1/004* (2013.01); *C02F 1/32* (2013.01); *C02F 1/4602* (2013.01); *C02F 1/46104* (2013.01); *C02F 1/484* (2013.01); *C02F 1/487* (2013.01); *C02F 5/00* (2013.01); *C23F 13/04* (2013.01); *C23F 13/06* (2013.01); *C25D 11/005* (2013.01); *C25D 11/022* (2013.01); *C25D 11/34* (2013.01); *C25D 11/38* (2013.01); *B01D 2252/1035* (2013.01); *B01D 2258/0283* (2013.01); *C02F 2103/007* (2013.01); *C02F 2103/008* (2013.01); *C02F 2103/08* (2013.01); *C02F 2103/18* (2013.01); *C02F 2201/4614* (2013.01); *C02F 2201/46125* (2013.01); *C02F 2201/483* (2013.01); *C02F 2303/04* (2013.01); *C02F 2303/08* (2013.01); *C02F 2303/20* (2013.01); *C23F 2213/32* (2013.01)

(56) References Cited

U.S. PATENT DOCUMENTS

| | | |
|---|---|---|
| 2004/0206680 A1 | 10/2004 | Johnson |
| 2005/0029174 A1* | 2/2005 | Collins .............. B01D 21/0009 210/143 |
| 2007/0125717 A1* | 6/2007 | Lyles, III .............. C02F 1/4674 210/748.17 |
| 2007/0235379 A1 | 10/2007 | Suddath |
| 2010/0016268 A1* | 1/2010 | Lyles, Jr. ................ A61K 35/08 514/180 |
| 2011/0143413 A1 | 6/2011 | Ren et al. |
| 2011/0174304 A1 | 7/2011 | Triplett, II et al. |
| 2013/0056648 A1* | 3/2013 | Fahs, II .................... C02F 1/30 250/432 R |

FOREIGN PATENT DOCUMENTS

| | | |
|---|---|---|
| CN | 102774938 A | 11/2012 |
| CN | 104684802 A | 6/2015 |
| ES | 2008549 A6 | 7/1989 |
| KR | 10-1408298 | 7/2014 |
| WO | WO-2011/147085 A1 | 12/2011 |

\* cited by examiner

METHOD AND SYSTEM FOR APPLYING SUPERIMPOSED TIME-VARYING FREQUENCY ELECTROMAGNETIC WAVE FOR MARINE BALLAST WATER BIO-FOULING CONTROL

CROSS-REFERENCE TO RELATED APPLICATIONS

This application is the National Stage of International Application No. PCT/SG2016/050358, filed Jul. 28, 2016, which claims the benefit of priority of International Application No. PCT/SG2015/050239, filed Jul. 29, 2015, the contents of both being incorporated by reference in their entirety for all purposes.

FIELD OF THE INVENTION

This invention relates generally to the field of treatment of an object or a region in order to utilize one or more treatment effects. More particularly, the invention relates to methods and systems for applying a superimposed time-varying frequency electromagnetic wave comprising both AC and DC components in a pulsating manner to provide disinfection of ballast water and ballast water treatment systems.

BACKGROUND OF THE INVENTION

In many cases, treatment of an object or a region formed by the object and the medium surrounding the object, such as ballast water and ballast water treatment systems, is necessary in order for treatment effects to be carried out, such as controlling the transportation of undesirable and invasive marine organisms.

Ballast water is water that is pumped in and out of ballast tanks in vessels to regulate stability, increase draft or otherwise provide ballasting action to the vessels. To control the transportation of unwanted invasive marine organisms by foreign-going vessels in such ballast water, the International Maritime Organization (IMO) and USCG implement regulations on ballast water treatment. The general control requirement specified by IMO is given as follows:

| Organisms | Max allowable at discharge |
|---|---|
| >50 μm | <10 per cu.m |
| 10~50 μm | <10 per ml |
| Toxicogenic Vibrio Cholera | <1 cfu/100 ml |
| *Escherichia coli* | <250 cfu/100 ml |
| Intestinal *Enterococci* | <100 cfu/100 ml |

In general, present ballast water treatment systems available in the market all approach treatment by a conventional disinfection concept, which uses methods such as chlorination, UV treatment, use of radicals, etc. However, none of these disinfection methods solve the problems in a complete, or holistic, manner. All the technologies available in the market focus on how to kill the organisms in the water but they have not been able to eradicate the organisms living in sediment in the tanks or underneath corroded steel areas.

The most common ballast water treatment disinfection technologies used in large scale applications can be broadly classified as follows:
1. Electro-chlorination (using active substances);
2. UV disinfection systems (without using active substances);
3. Combining Fine filter/UV/AC Ultra Low Frequency avalanche current (without using active substances)

Despite being the most commonly used large scale disinfection systems in the marine industries, these systems have many shortcomings.

The electro-chlorination system uses a DC electrolysis system to electrolyze seawater to produce chlorine/hypochlorite for disinfection or to kill the organisms in the water. Organisms that are greater than 50 μm in a major dimension are usually pre-removed by either cyclone separators or mechanical mesh filters. Organisms that are smaller than 50 μm are then disinfected or killed by the active substance such as chlorine/hypochlorite. In the process of electrolysis, toxic chlorine and explosive hydrogen gas are inevitably generated which is one of the major shortcomings of these systems.

Another issue with the electro-chlorination system is that the amount of oxidizing agent and active substances produced are harmful to the environment. The oxidizing agent amount is usually measured by the total residual oxidants (TRO) present in the water. Depending on the type of water and also the organisms present, the amount of TRO required by an electro-chlorination system for control of organisms in water is in general more than 10 ppm. However, water with such a high dosage of TRO is also harmful to the environment and cannot be discharged directly without further treatment to reduce the TRO.

A further issue is that such high TRO levels cause severe corrosion to the metallic structures and equipment in the piping system and they may also affect the material integrity of some non-metallic structures. For environmental reasons, statutory requirements usually require the discharge water TRO be further treated to 0.2 ppm or less. To meet this requirement, dosing with a TRO reducing agent before discharge will be needed, which is a further disadvantage for electro-chlorination systems.

For effective control of organisms in a ballast water system, it is critical that bio-film sites are controlled or eradicated, instead of just focusing on the kill rate of the organisms in the bulk water. In electro-chlorination systems, chlorine and hypochlorite are effective in killing the organisms in bulk water but have very limited success in penetrating the biofilm to kill the bacteria and organisms living inside the system. Obviously the corrosion on the steel surface caused by the TRO creates more corrosion sites which are unreachable by the disinfectant, which then compromises the disinfection efficacy.

Yet another issue with the chlorination system is the control of re-growth of phytoplankton. Phytoplankton can re-grow very quickly after the chlorination treatment effect subsides if the nutrients and correct growth environment exist. Therefore if chlorine-treated ballast water is kept in the ballast tank for a long period of time the phytoplankton may still survive and hence be introduced to another country, even though the water is deemed to have been treated. This problem is especially common for ballast water treatment systems which only treat the ballast water as part of the ballasting cycle but not at de-ballasting.

Yet another shortcoming for the electro-chlorination system is the natural chloride content of the water being used for ballasting. If the chloride content is low, such as in estuary or river water, the amount of chlorine and hypochlorite generated may be too low for effective disinfection. Some systems resort to using another tank to carry seawater to then electrolyze the seawater for injection into the fresh water for disinfection but this reduces the cargo capacity of the ship.

The shortcomings of the electro-chlorination system can be summarized as follows:
1. Generation of explosive hydrogen gas;
2. Corrosion issue due to high TRO;
3. TRO reduction treatment is required after treatment;
4. Bio-organisms may be immune to chlorination;
5. Inability of chlorine to penetrate biofilm to eradicate organisms living in biofilm;
6. Inability to control re-growth of phytoplankton after treatment;
7. Unable to provide effective disinfection if chloride content in water is low UV disinfection treatment technology uses the UVC range of UV light to disinfect the water. Some may use UVA and UVB in conjunction with UVC for disinfection but the concept and methods are same. When UV is used for disinfection, there are also many disadvantages.

UV treatment is effective only at the point of treatment and it does not have a residual effect to carry the treatment effect through the whole system. When the treatment system lacks a residual treatment effect, those organisms and bacteria not killed at the point of treatment or left in the piping systems, including the tank, will be able to grow and multiply again leading to a poor overall disinfection result.

Since UV does not have a residual effect, the effect cannot be carried by the treated water to eradicate the biofilm. This results in the growth of organisms or ineffective disinfection.

The general concept is that UV does not induce any corrosion problems but in actual ballast seawater treatment, the very strong UV dosage used for the disinfection functions can cause the TRO in the water to rise. In some extreme case, the increase in TRO by very strong UV can reach as high as 0.5 ppm especially with the present of $TiO_2$. Not only does this exceed the discharge water TRO requirement, but the residual oxidants also accelerate the corrosion rate of the immersed metallic structures. This in turn creates a chain effect of creating more habitats for the organisms, which then need higher dosages of disinfection, which then result in more TRO and hence more corrosion.

Many UV ballast systems rely on very fine filters to filter off the >50 µm organisms and then use UV to kill the <50 µm organisms, including bacteria. While UV can provide effective disinfection with good killing and control of the bacteria count in bulk water, it is less efficient in killing larger organisms. For organisms larger than bacteria, the strength of the UV required to kill them is very high, especially for phytoplankton, and hence the power consumption of such systems will also be high. As a result, the power consumption for many types of UV system for ballast water treatment is very high. Using LED UV may reduce the power consumption, but the cost of LED UV is, itself, extremely high. Regardless of whether low, medium or high pressure UV lamps are used, the power consumption is so high that for large ballasting capacity vessels, it may be necessary to install additional generators onboard to provide the extra power and in many cases this is not practical.

The effect of water conditions also affects the efficacy of UV treatment. The strength of the UV light is greatly affected by the water turbidity as well as by fouling conditions on the UV lamp quartz sleeve which is in contact with water. Under high silt content and turbid water conditions, such as in ports, river water or estuary water, it is very difficult for the UV light to penetrate through the turbid water which then compromises the disinfection efficacy. Currently there is no filtration system in the market that is able to filter the silt effectively under the large flow conditions required for ballast water treatment. If the water turbidity issue is not resolved, the application of UV in turbid water is not practicable.

In addition to water turbidity, fouling on UV lamp quartz sleeves will cause the UV treatment efficacy to deteriorate further. Using chemicals or brushes to clean the fouling adds to operating and equipment costs, although they may help to maintain the treatment efficacy to a certain extent.

The third type of treatment combines fine filters with UV and AC Ultra Low Frequency avalanche currents. These require very high performance fine filters of <50 µm mesh to remove the larger organisms to maintain the effectiveness of the disinfection. This is due to the fact that the UV+ pure AC ULF treatments are less effective in treating larger organisms unless extremely high power is used. Should the filter mesh or seals develop leakage during operation, large organisms will pass through the filter and enter the UV and ULF chamber directly. This can then affect the UV+ULF treatment such that it is not able to meet the larger organism disinfection requirements.

Another drawback with the UV+ULF treatment is that it requires two separate processes to produce effective disinfection control. Without the UV, the ULF treatment itself will not be able to meet stringent marine ballast water treatment requirements even though the ULF treatment has a disinfection effect. In ballast water treatment, the disinfection requirement requires the full disinfection effect to take place on the day of deballasting after treatment for bacteria, 10~50 µm organisms and >50 µm organisms. ULF treatment alone will take more than two days to meet this deballasting discharge requirement unless the ULF strength is increased substantially. Alternatively, a UV system may be added to supplement the ULF disinfection treatment effect, especially on the total bacteria count, to ensure it meets the disinfection count requirement by the second day. However, once the UV system is incorporated into the ULF system, the shortcomings of the UV system noted above are also relevant to the combined UV+ULF system.

Yet another issue with a pure AC ULF system is that the avalanche current can only be produced in a non-metallic chamber or pipe section. Hence for application in a metallic ballast water system, a non-metallic pipe section needs to be added into the steel ballast water pipes, and these non-metallic sections may not be sufficient for applications that require high pressures and/or to satisfy explosion-proof safety requirements.

The above mentioned technical issues regarding Ballast Water treatment requirements are referring to IMO (International Maritime Organization) requirements. The latest United States Coast Guard USCG ballast water treatment requirement which came in force in early 2016, imposed a much more stringent requirement on 10~50 um phytoplankton organism disinfection than the IMO requirement.

The IMO requirement accepts the 10~50 um phytoplankton count after treatment by the so called "Most Probable Number" MPN count number. That is the phytoplankton although not killed immediately after the treatment is allowed to go through 14 days of "regrowth" period. Should the phytoplankton be unable to multiply in these 14 days and the total number is remaining at less than 10 per ml, it is considered as passed by IMO standard.

For the new USCG requirement, no MPN is allowed to be used for counting the phytoplankton. The phytoplankton must be totally "dead" after holding for a period as specified in the test. The holding days are usually less than 5 days. By totally "dead" is meant not only that the phytoplankton organism cannot multiply, but also that there should be no detectable metabolic activity in the phytoplankton cell.

With this new totally "dead" requirement, the conventional UV system will need to add on at least 4 to 5 times more power to the already very high, impractical power consumption characteristic. This makes the conventional UV system totally impractical for shipboard application.

For the UV+pure AC ULF system, the same situation as conventional UV arises although the power consumption increase is less than in the case of conventional UV.

The listing or discussion of an apparently prior-published document in this specification should not necessarily be taken as an acknowledgement that the document is part of the state of the art or is common general knowledge.

It has been always a challenge to develop alternative technologies for obtaining various treatment effects that are effective, cause no harm to the environment and yet are able to meet the latest most stringent USCG requirement. Therefore, there is a need for new methods and systems that are capable of carrying out effective disinfection of ballast water and meeting the most challenging USCG 10~50 urn phytoplankton treatment requirement without causing harm to the atmosphere or aqueous environments.

SUMMARY OF THE INVENTION

The present invention has been developed to fulfill the needs noted above and therefore has a principal advantage in that it provides a system, for applying a superimposed time-varying frequency electromagnetic wave to a target object or a target region, which is environmentally sound and does not leach chemical products into the surroundings. The present invention utilizes the methods and systems described in the parent application from which this application claims priority, and further provides specific methods and systems for treating and disinfecting ballast water.

Another advantage of the invention is that it can provide methods and systems for treating ballast water and can provide ballast water treatment systems which are significantly more economical and convenient to utilize than the prior art and yet is able to meet the USCG requirement.

A further advantage of this invention is that it can provide a ballast water disinfection system with one or more of the following desirable features:

1. Ability to provide a totally "dead" disinfection for the phytoplankton as required by USCG standard.
2. No generation of explosive hydrogen gas.
3. Instead of producing long lasting residual oxidants TRO, such as chlorine/hypochlorite/ozone, in the water for disinfection as in the conventional system, the disinfection effect by this invention produces negligible TRO generation (similarly to the pure UV system as required by IMO or USCG).
4. It has a disinfection capability for a broad range of sizes of organisms including killing >50 μm organisms after a filter/cyclone and also killing organisms less than 50 μm, including bacteria.
5. It produces a corrosion protection effect on steel or metallic members in ballast piping systems and tank.
6. No bio-organism immunity issue.
7. Ability to penetrate biofilm to eradicate organisms living in the biofilm.
8. Ability to control re-growth of phytoplankton for at least two weeks after treatment.
9. Energy consumption is low.
10. Able to perform in turbid, freshwater, estuary and seawater water conditions.
11. Long residual disinfection effect.
12. Ability to apply in non-metallic and metallic piping systems.

The present invention uses a DC biased time-varying pulsating wave to produce a disinfection effect that can meet all the above requirements but without creating undesirable side effects or issues such as are produced in UV, electrochlorination and pure AC/ULF disinfection systems.

The invention provides a method for treating ballast water in accordance with Claim 1 of the appended claims. The invention further provides a ballast water treatment system in accordance with Claim 18 of the appended claims.

A ballast water treatment method in accordance with the invention may include the steps of supplying rectified DC power to an ultra-low frequency (ULF) AC wave generator, generating an alternating time-varying modulated low frequency pulsating wave from the rectified DC power, and superimposing the alternating time-varying modulated low frequency pulsating wave to form a DC biased pulsating AC electromagnetic wave. Preferably the ballast water is passed through a mechanical filtration process prior to treatment by the DC biased pulsating AC electromagnetic wave. Advantageously the DC biased pulsed AC time-varying wave output may be controlled by a pulse width modulator.

Preferably the system of the invention further comprises a mechanical filtration system for separating particles and organisms having a size greater than 50 μm from the ballast water prior to treatment by the DC biased pulsating AC electromagnetic wave.

The DC biased pulsating AC electromagnetic wave treatment can be created by many different methods;
a) By connecting a DC power supply in the manner as described in the following description.
b) By connecting an inductive diode at the DC output from the ULF AC wave generator.
c) By programing the waveform to give the DC biased output.

The time-varying AC wave may also be programmed to produce an intermittent waveform or other configuration. The waveform may be square, sine, triangular, irregular, or random but as long as it is AC time-varying, has a DC current biased component and is pulsed, it will produce the necessary effect. Preferably the frequency range, the DC amplitude and the voltage of the pulses are fine-tuned to control different organisms and and provide desired water quality.

In this invention, the time-varying pulsating wave rides on a DC biased voltage and current. Although the DC biased pulsating AC time-varying frequency wave carries both the DC component and the alternating wave form, its treatment effect is completely different from DC, AC or simply combining two separate AC and DC waves. For example, when using DC electrolysis to treat seawater, high chlorine/hypochlorite, TRO or TRC (Total Residual Chlorine) will be generated. In addition, the negative issues of anode/cathode surface polarization such as scale formation, increase in electrode to field resistance etc. will surface. When using an AC pulsating wave, the immediate disinfection "kill" effect is very weak. If combining separate AC and DC waves, the DC effect will dominate the immediate kill effect due to the disinfectant produced but high TRO/TRC/chlorine/hypochlorite will also be generated and add to all the shortcomings of the DC system. When using the time-varying DC biased pulsating wave of the present invention, negligible or practically no TRO/TRC similar to the UV system is generated yet the immediate disinfection kill effect is as good as, if not better than, DC electrolysis systems.

Compared with DC electrolysis in an electro-chlorination system, the anode and cathode in the DC electrolysis will discharge or receive fixed direct current which is carried across from the anode to the cathode by the ions in water. Very importantly, for conventional electro-chlorination using DC electrolysis, the current in the water is not pulsed. The electrons are exchanged at the electrode surfaces and hence the chemical reactions take place at the electrode surfaces. Chlorine is therefore produced on the anode side, if the water contains chloride, and hydrogen will be produced on the cathode surface. The chlorine will further react with the water and form into hypochlorite for disinfection. With prolonged operation, mineral scales will form on the cathode surface and acid wash is needed to dissolve the scale.

With a pure AC ULF treatment system, there is no anode or cathode and there is no DC current in the water and so its disinfection effect solely relies on the charged ionic wave energy produced in the water if the correct frequency is applied inside a non-metallic compartment. This is because the disinfecting ULF charge wave is an alternating wave without a fixed net DC current direction, so no disinfecting agent such as hypochlorite, ozone or other active substances are produced in the water. The pure AC ULF disinfection treatment, however, lacks an immediate kill effect and hence is unable to meet the IMO/USCG ballast treatment organism control requirement for >50 μm organisms, 10~50 μm organisms or bacteria without aid from other systems.

In this invention, a time-varying DC biased pulsating wave is produced between two emitters. Simultaneously, an avalanche charged ionic wave current is also produced in the water due to the time-varying pulsating effect. With the arrangement of the present invention, practically no TRO/TRC similar to the pure UV system is produced due to the alternating nature of the DC biased pulsating AC time-varying wave both in the water and at the emitter surfaces. As is generally known in the field of electrochemistry, the reactions at the electrode surface and the chemical substances produced thereat are subject to the effects of both AC and DC. In the present invention, while the DC biased current could result in the production of oxidizing agents such as chlorine at the electrode surface by the electron exchange at the electrode surfaces, the alternating AC wave voltage which acts concurrently on the same electrode surface suppresses or controls the chemical reaction at the electrode surface, depending on the applied voltage of the AC wave and its frequency range.

In DC electrolysis, the chemical reaction taking place at the electrode surface is very much determined by the net DC over-potential and the duration available for the full chemical reaction to take place. Typically, for a full chemical reaction to take place on an electrode surface, it may require in the order of a second. In the DC biased time-varying AC pulsating wave condition each alternating pulse is in the order of milli- or micro-seconds, and hence, before a DC generated chemical reaction could take place on the electrode surface, it is suppressed by the opposing direction AC component wave. In simple terms, before a full DC-derived chemical reaction can take place on the electrode surface, the AC voltage and frequency can be regulated to suppress it whilst still allowing the electrons to move in an alternating manner across the electrode surface.

As a result, an extremely potent and instantaneous disinfection effect can be produced. This extreme, short-lived instantaneous disinfection effect can be controlled such that it does not produce corrosive oxidizing agents such as chlorine or hypochlorite. However, its AC energizing effect is able to produce a long lasting residual disinfection effect. In addition, the synergy effect from the excited wet plasma energy of the water clusters radiated out from the emitters under this DC bias time-varying treatment further amplifies the disinfection effect. The resultant disinfection is able to control a much wider range of organisms including the >50 μm organisms, 10~50 μm organisms and bacteria. Furthermore, it also results in a longer residual energy disinfection effect, although that is much weaker than the initial instantaneous disinfection strength.

With the above DC superimposed time-varying wave, for effective ballast water treatment to control the full range of organisms from >50 μm to 10~50 μm to bacteria, the increase in TRO in water measured is negligible and can be neglected or is at a level much lower than in UV treatments.

In conventional DC electrolysis, the measured TRO concentration required by DC electrolysis to kill the organisms in order to meet IMO ballast water requirements is more than 10 ppm and typically in the range of 15~25 ppm. The TRO in the treated water is allowed to slowly degrade during the five-day ballast water holding period and hence it needs to drop to a low of less than 0.2 ppm within five days after treatment to pass the IMO requirement. If it does not meet the TRO discharge limit, then TRO-reducing chemical agents must be added to reduce the TRO level before discharging.

In order to avoid generation of hydrogen in the DC superimposed time-varying AC pulsed wave method of the invention, the cathode area may also be increased, for example by using the metallic pipe internal surface as a cathode, which will reduce the cathode current density significantly. In this way, hydrogen gas is not generated at the cathode surface as long as the current density is low and the cathode potential is controlled to be not more negative than −1.1 V compared to an Ag/AgCl reference electrode.

By using the negligible TRO concentration disinfection approach of this invention, the water oxidizing corrosion effect is also reduced or removed. Additionally, another advantage of the invention is that the time-varying DC biased pulsating AC excitation effect will cause a magnetite layer to form readily on the steel surface which further protects the steel against corrosion. In addition to magnetite generation, the DC bias amount and the current flow direction can be further regulated to shift the steel pipe to an electrolyte electrical potential that is more negative, such that it is negative enough to meet the conventional full corrosion cathodic protection criterion that it must be more negative than −0.8 volt compared to an Ag/AgCl reference cell.

The DC biased time-varying pulsating wave of the invention and its effects are different from the combination of a separate conventional DC electrolysis system and a pure AC ULF excitation method for disinfection. The wave and current generated in the water in this invention are also totally different from the effects of combining DC electrolysis and a pure AC ULF excitation. With the separate DC electrolysis and AC ULF excitation in one common water housing, the fixed constant DC current (without the pulsating effect of the present invention) travels independently in the water without any pulse and the pure AC ULF wave generated also remains alternating symmetrically in the same positive and negative voltage/current magnitude in the water without any DC shift. This means that there is no time-varying DC pulsating wave that can be detected in the water. In the present invention, the waveform detected in the water as well as on the electrodes is a directional pulsating time-varying DC pulsed AC wave.

References to a housing herein includes reference to one or more chambers, and may also include pipes. The housing may be either part of a closed loop system or of an open loop system.

Another major difference between this invention and conventional DC electrolysis/pure AC ULF is in the disinfection mechanisms and in the resulting effects.

The time-varying DC pulsating wave of the system and method of the invention, due to its pulsating ionic electromagnetic AC wave nature, is able to penetrate biofilm and can also affect the cysts or eggs of the organisms. This resolves the biofilm penetration issue and also the issue of a cell's resistance to chemicals/TRO. Unlike chemical treatments, the time-varying DC biased pulsating AC wave disinfection treatment has not shown any sign of bacteria or other organisms developing any immunity. The re-growth test for phytoplankton has also confirmed that it is unable to re-grow when it is given the correct dose of treatment, which consequently also provides a long term residual effect.

Another major benefit of the time-varying DC pulsating AC wave is that its disinfection efficacy is less sensitive than prior art systems to changes in water conductivity. For DC electrolysis, the anode output current and hence the number of TROs released into water is proportionate to the water conductivity. In many cases, when a ship is navigating from the sea into an estuary or river, the DC electrolysis current output will be reduced due to lower water conductivity which then affects the treatment efficacy. Seawater may be stored on board for generation of chlorine but it occupies much water tank space. In contrast, as the time-varying DC pulsating AC wave treatment does not rely on a high TRO amount to kill the organisms and its main mechanism is via the synergy effect of the pulsating AC wave effect and the instantaneous electron exchange reaction on the electrode surface, the amount of TRO produced does not affect the overall treatment efficacy and hence the water conductivity does not affect the results. The time-varying DC pulsating AC wave works well in both freshwater and seawater and it is very much less affected by changes in water conductivity and chloride content in water than are DC electrolysis systems.

Features of systems and methods for producing and applying a DC biased time-varying pulsating AC wave are described in the application from which this application claims priority.

Thus, the DC biasing unit may be selected from the group consisting of switch mode DC power supply, an AC to DC converter, a rechargeable DC battery and an inductive diode filter. The device for generating the superimposed time-varying frequency electromagnetic wave may be provided as a prefabricated electronic circuit. The DC biasing unit may provide a variable DC bias voltage or a fixed DC bias voltage according to the actual needs and requirements.

In some cases, the DC bias voltage is selected such that the superimposed time-varying frequency AC electromagnetic wave is produced to have polar asymmetry or become a unidirectional pulsating wave, or the DC biasing unit is selected to produce the superimposed time-varying frequency AC electromagnetic wave that has half-wave distortion, partial distortion or full-wave distortion.

The positions of the first and second excitation sites may be varied according to actual needs and requirements. The two excitation sites may be arranged in the ballast water, or on a same surface of the housing of the ballast water system in a spaced relation, or on two different surfaces of the ballast water system, or may be arranged in the ballast water and on one or more surfaces of the ballast water system.

In one embodiment of the invention, the AC wave generator comprises a control unit configured to generate a signal having the time-varying frequency AC electromagnetic wave at the desired sweeping time, and one or more bridge-type circuit coupled to the control unit for receiving the signal generated from the control unit, the bridge-type circuit being driven by the received signal to generate and amplify the AC driving signal of the time-varying frequency AC electromagnetic wave, wherein the bridge-type circuit is configured to comprise one or more half-bridge driver integrated circuits (ICs) and one or more Metal Oxide Semiconductor Field Effect Transistors (MOSFETs) coupled to the respective half-bridge driver ICs. In another embodiment, the control unit comprises a programmable integrated circuit (IC) for time-varying the frequency of the AC driving signal, and optionally a stabilizer circuit for stabilizing the AC driving signal.

Advantageously, the frequency of the superimposed time-varying frequency electromagnetic wave is between about 100 Hz and about 1 MHz, and preferably between about 100 Hz and about 200 kHz. The sweeping frequency of the superimposed time-varying frequency electromagnetic wave is between about 1 Hz and about 1 KHz, and preferably between about 10 Hz and about 100 Hz.

Unlike the methods and systems known in the prior art, the essence of the invention is to use the superimposed time-varying frequency electromagnetic wave to apply onto the object or the region to be treated. Therefore, the object or the region is simultaneously subjected to the effect of the electrical and magnetic fields and to the effect of AC pulsating and DC biased component. As a result, the current produced in the conductive object or in the medium may carry the pulsating positive and negative charged ions, electrons or other charges, which increases the vibration and rotational internal energy of molecule clusters and dissolved ions as well as causes the direct excitation of the object and the medium.

To have a better understanding of the invention, reference is made to the following non-limiting description of the invention and embodiments thereof in conjunction with the accompanying drawings.

BRIEF DESCRIPTION OF THE DRAWINGS

In the drawings, like parts are designated by like reference numerals.

DETAILED DESCRIPTION OF THE PREFERRED EMBODIMENTS

While this invention is illustrated and described in relation to non-limiting preferred embodiments, the system for applying a superimposed time-varying frequency electromagnetic wave to a target object or a target region may be produced in many different configurations, sizes, forms and materials.

The term "medium" used herein may refer to a gas, a liquid or a solid or any combination thereof, which surrounds the object, and the medium and the object form together a region that requires for desirable treatment effects. Advantageously, the medium is ionized or conductive, for example an electrolyte such as water, oil, soil and the like. In preferred embodiments of the present invention, the medium comprises ballast water.

The term "actuator" or "emitter" used herein refers to an element that is able to employ the superimposed time-varying frequency electromagnetic wave to energize the target object or the target region, such that the target object or region is subjected to the treatment of the superimposed time-varying frequency electromagnetic wave.

Figure 9A:
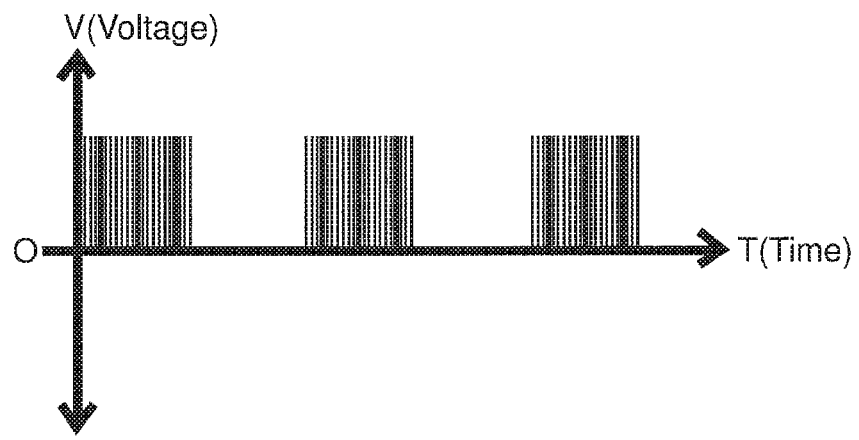
FIGS. 9A and 9B are schematic views of fifth exemplary wave forms of the superimposed time-varying frequency electromagnetic wave.
Figure 9B:
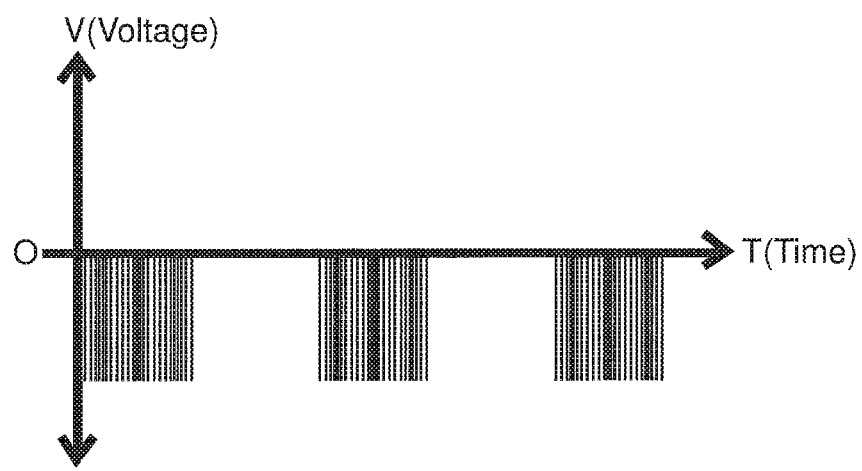
Figure 10:
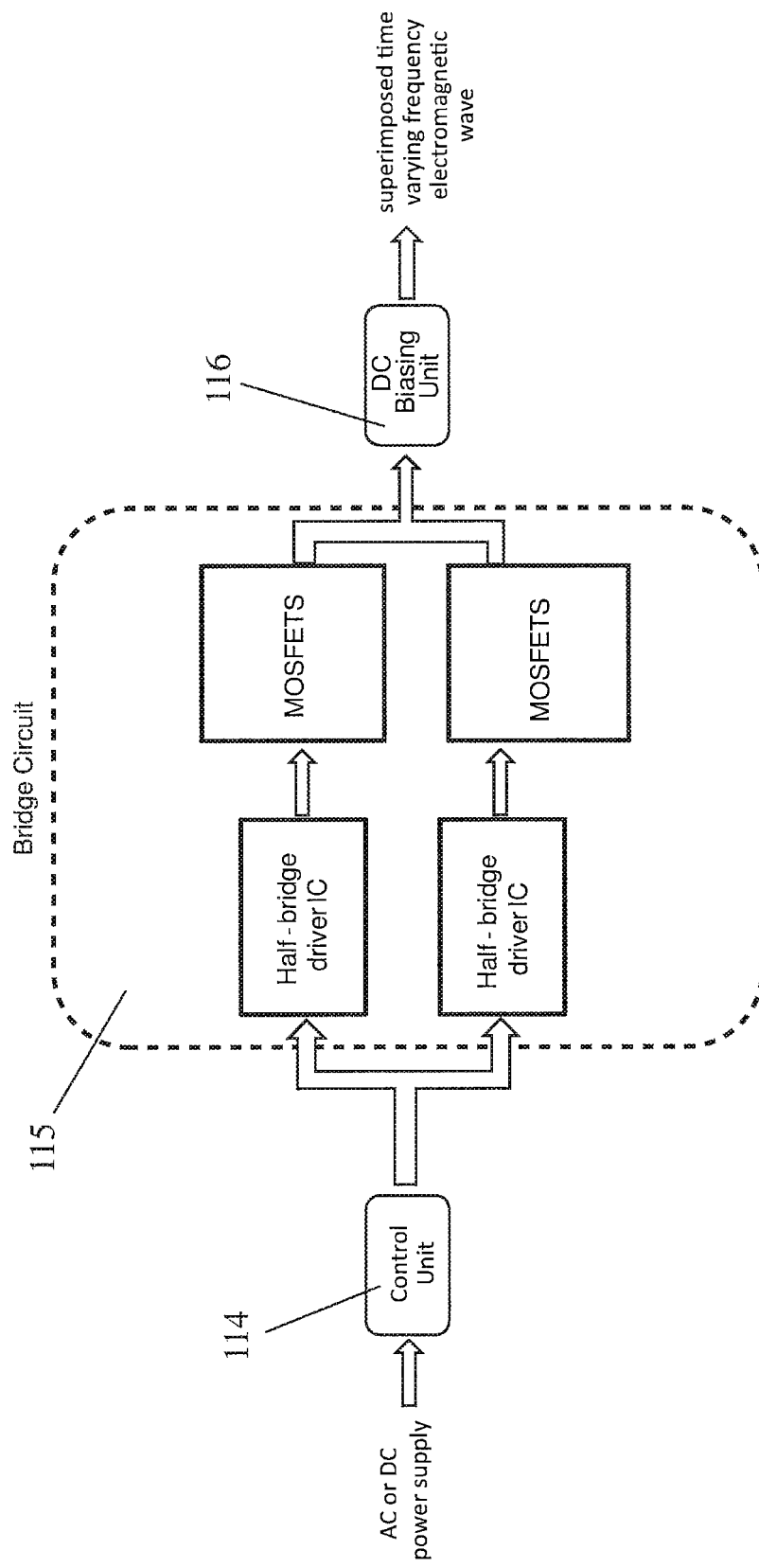
FIG. 10 is a schematic view of an exemplary AC wave generator.
Figure 11:
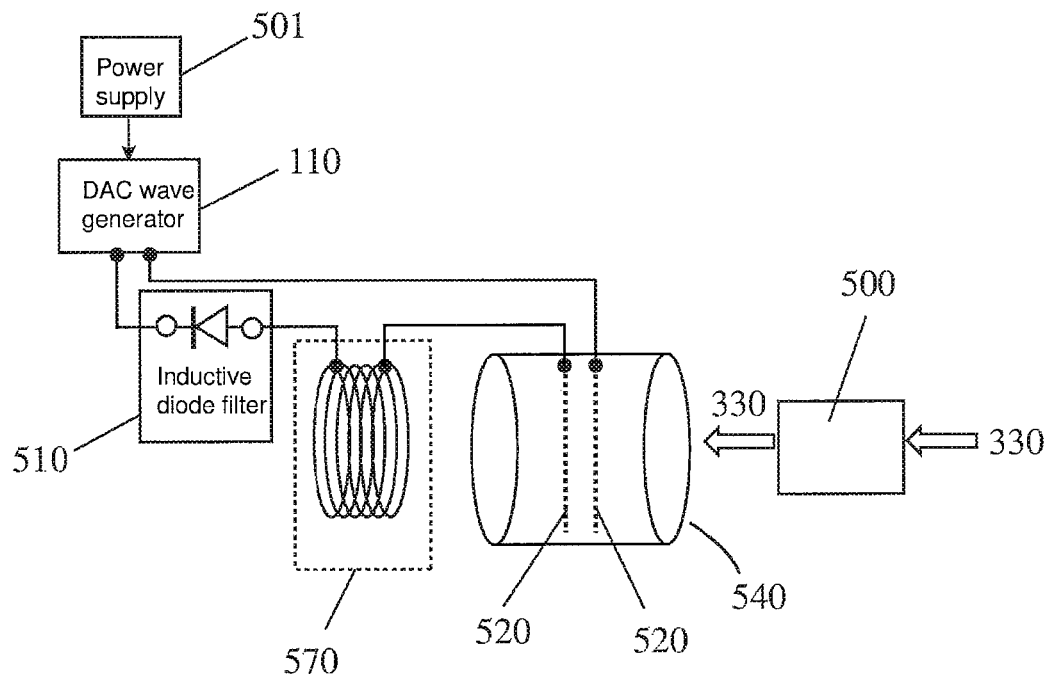
FIG. 11 is a schematic view of an exemplary arrangement of a ballast water treatment system according to the invention.
Figure 12:
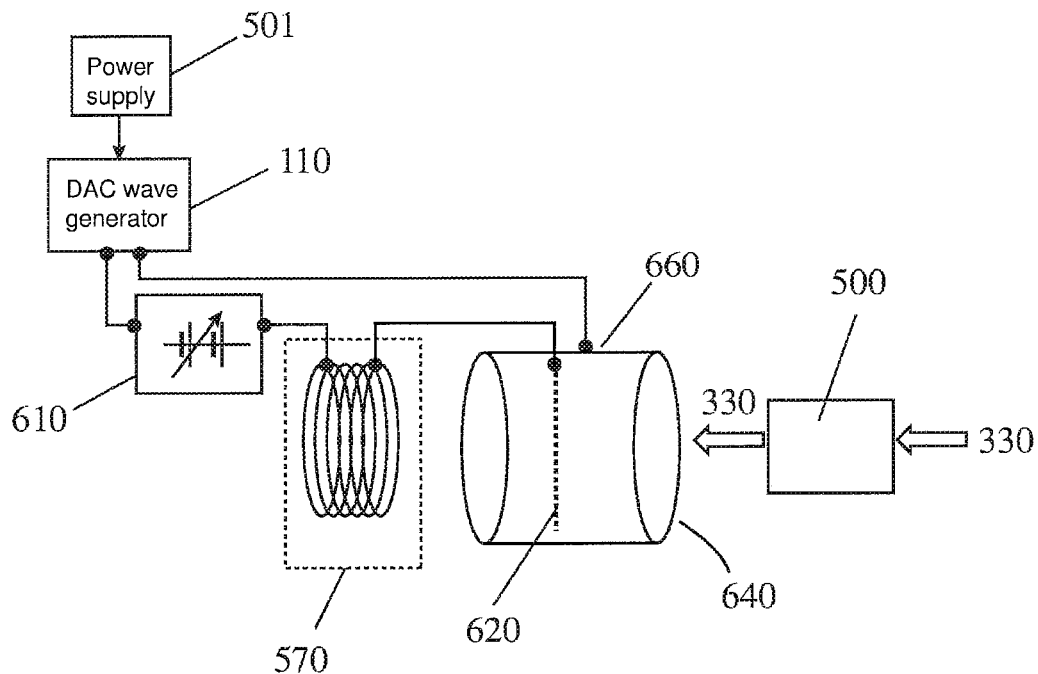
FIG. 12 is a schematic view of an alternative exemplary arrangement of a ballast water treatment system according to the invention.

FIGS. 1 to 10 and the corresponding following description relate to methods and systems for producing a superimposed DC pulsing ionic wave current. FIGS. 11 and 12, and the corresponding description relate to the specific invention with respect to the methods and systems for treating ballast water.

Figure 1:
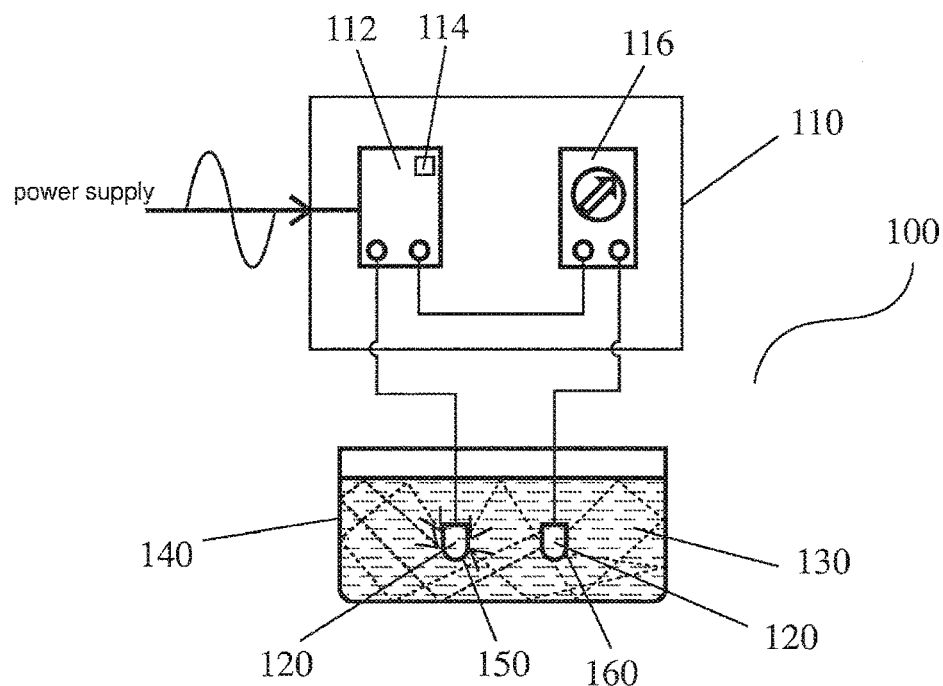
FIG. 1 is a schematic view of an exemplary arrangement of a superimposed time-varying frequency electromagnetic wave system which is constructed in accordance with a first embodiment of the invention.

Referring now to the drawings, FIG. 1 provides a system 100 constructed consistent with a first embodiment of the present invention. In this embodiment of the invention, the system 100 comprises a device 110 for generating a superimposed time-varying frequency electromagnetic wave. The device 110 comprises an alternating current (AC) wave generator 112 and a direct current (DC) biasing unit 116, which is electrically coupled in series with the AC wave generator 112.

The system 100 further comprises two actuators 120 each electrically coupled with a respective output terminal of the device 110.

As shown in FIG. 1, the actuators 120 are immersed in a conductive liquid 130 (i.e. water, such as sea water, fresh water, estuary water) contained in a container 140. The actuator of the invention serves to energize the conductive liquid 130 with the superimposed time-varying frequency electromagnetic wave. A first excitation site 150 and a second excitation site 160 are arranged in spaced relation in the liquid, such that their connection with the actuators 120 does not cause a problem of short circuiting. The device 110, the actuators 120 and the conductive liquid 130 together form a closed loop circuit. In this embodiment, the liquid (water) 130 is to be treated for the purposes of control of bacteria and biological growth, and may include control of scale formation, control of corrosion, and/or control of water-hardness. The material of the actuators 120 can be any metals, solid conductive materials or materials coated with conductive material, and can be selected from the group consisting of steel, copper, zinc, graphite, stainless steel, titanium, metal oxide coated titanium and the like. The actuators 120 can be of any geometrical shape including round, square, rectangular and triangular shapes, and may be provided in the form of bars, rods, tubes, dishes, plates, spheres, cubes, hollow forms, solid forms, perforated forms, meshes, etc. The actuators 120 may be immersed in the liquid, or can effect a direct excitation on the conductive materials including metallic and non-metallic materials or structures.

The AC wave generator 112 is electrically coupled with a power supply and configured for generating an AC driving signal of AC electromagnetic wave having a time-varying frequency at a desired sweeping time. The power supply can be a DC or AC power supply. In the preferred embodiment of the invention, the power supply is advantageously of DC nature and provides an input DC signal to the AC wave generator 112. As illustrated in FIG. 10, the AC wave generator 112 in this embodiment comprises a control unit 114 configured and programmed to generate a signal having the desired time-varying frequency at the desired sweeping time, this signal generated by the control unit 114 being in the magnitude of milli-amperes.

The AC wave generator 112 further comprises one or more bridge-type circuits 115 electrically coupled to the control unit 114 to receive the signal generated by the control unit 114. The bridge-type circuit 115 is configured to be driven by the received signal to generate and amplify an AC driving signal in the magnitude range of milli-ampere to ampere, for example. This AC driving signal corresponds to the time-varying frequency AC electromagnetic wave having the desired sweeping time and is delivered to the DC biasing unit 116 for superposition on the DC output. The bridge-type circuit 115 comprises two sets of sub-circuits in parallel as illustrated. Each of the sub-circuits comprises a half-bridge driver integrated circuit in connection with two or more MOSFETs. If the main AC source is applied, an AC-to-DC converter may be embedded in the AC wave generator 112 for converting the AC power supply to a DC power supply which is then applied to the control unit 114. The power supply applies to the AC wave generator 112 a voltage according to the actual applications, for example between about 12V to about 200V.

The various electronic components in the AC wave generator 112 may be provided on a printed circuit board (PCB). If an AC-to-DC converter or rectifier is needed, it may also be mounted on the PCB as a compact structure.

As described above, the control unit 114 generates the time-varying frequency signal at the desired sweeping time. The sweeping time is selected to ensure the liquid has the correct time frame to expose it to the corresponding frequency for the correct exposure time period. For different applications, a wide range of frequencies may be selected. Preferably, the frequency of the superimposed time-varying frequency electromagnetic wave used in the invention may be in the range of 100 Hz to 1 MHz, preferably in the range of 100 Hz to 200 kHz, with the sweeping frequency between about 1 Hz to 1 kHz, preferably in the range of 10 Hz and 100 Hz. The waveform of the superimposed time-varying frequency electromagnetic wave can be square, triangular, rectangular, sinusoidal or other forms. In this embodiment, the control unit 114 comprises a programmable integrated circuit (IC) for time-varying the frequency of the AC driving signal, and a stabilizer circuit for stabilizing the AC driving signal.

The direct current (DC) biasing unit 116 is electrically coupled in series with the AC wave generator 112 and configured for producing a DC output with a predefined DC bias voltage which may be varied or fixed. The DC biasing unit 116 is programmed such that the DC output is mixed with the amplified AC driving signal received from the AC wave generator 112 to produce the superimposed time-varying frequency electromagnetic wave where the time-varying AC wave is riding on the predefined DC bias voltage. In this embodiment, the DC biasing unit 116 is a switch mode DC power supply. A rechargeable DC battery or AC-to-DC rectifier power supply are possible alternatives for the DC biasing unit 116. When a rechargeable DC battery is used as the DC biasing unit 116, an extremely pure DC output can be generated and is particularly suitable for some applications requiring an extremely pure DC source.

It is advantageous that the DC bias voltage matches the voltage and frequency of the AC pulsating wave coming from the AC wave generator 112. In general the DC bias voltage is lower than the time-varying pulsating wave voltage. The DC bias voltage is therefore adjustable to suit the different onsite treatment requirements. In some cases, the DC bias source is configured to be able to take an inflow of current/voltage if the time-varying pulsating AC wave should surge into the DC bias source.

One feature of the invention is that the unique superimposed time-varying frequency electromagnetic wave can be generated only when the right combination of the AC wave generator 112, the DC biasing unit 116 and the actuators 120 are connected to one another in series.

The superimposed time-varying frequency electromagnetic wave of the invention is different from the simple combination of applying a DC component and a separate time-varying frequency AC wave. If a DC component is separately applied to a time-varying frequency AC wave, there is no superimposed DC pulsed wave produced or presented in the liquid. The DC component is static and would exert separately its own DC effect, and the separate time-varying frequency AC wave, which is balanced in positive and negative amplitude without the DC characteristics, would exert its own effect too.

Figure 5A:
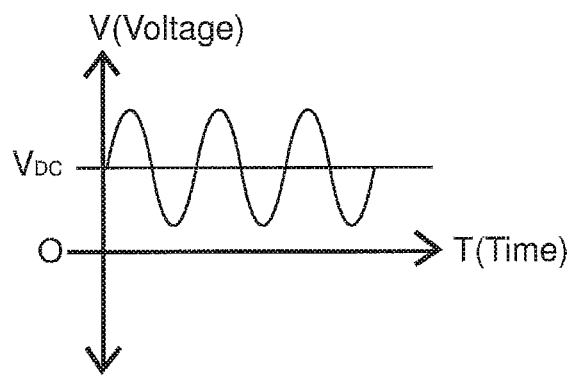
FIG. 5A to 5C are schematic views of first exemplary wave forms of the superimposed time-varying frequency electromagnetic wave.
Figure 5B:
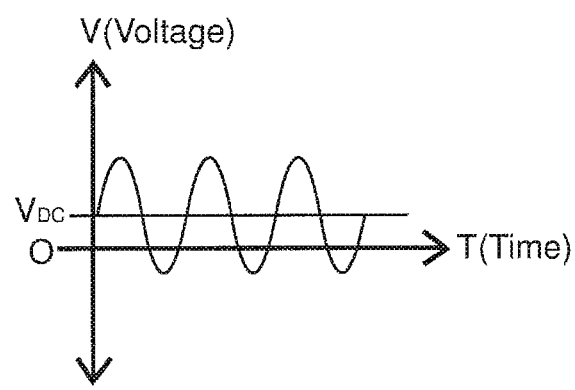
Figure 5C:
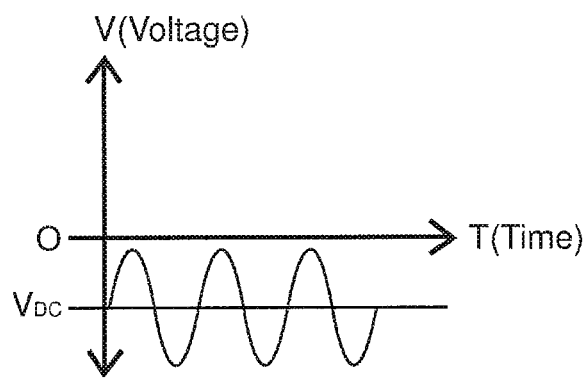
Figure 6A:
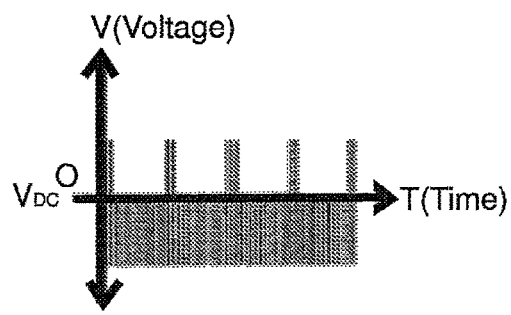
FIG. 6A to 6D are schematic views of second exemplary wave forms of the superimposed time-varying frequency electromagnetic wave.
Figure 6B:
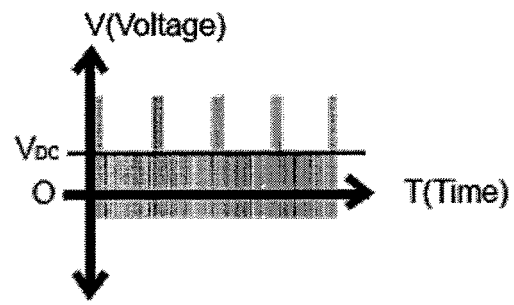
Figure 6C:
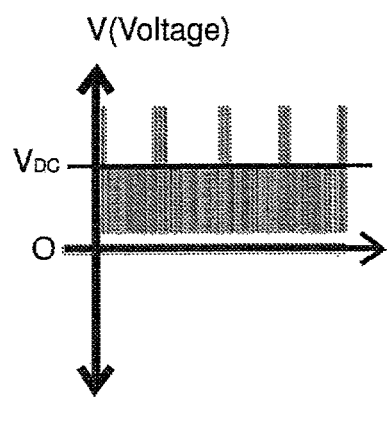
Figure 6D:
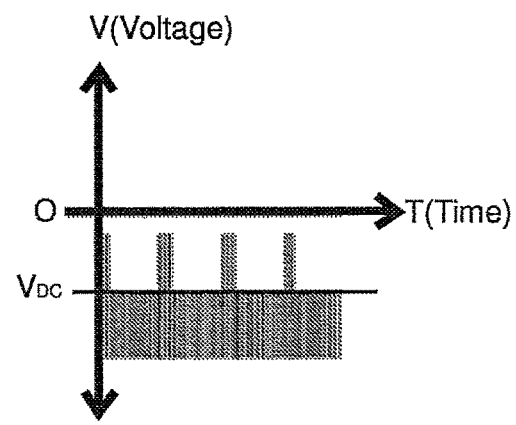
Figure 7A:
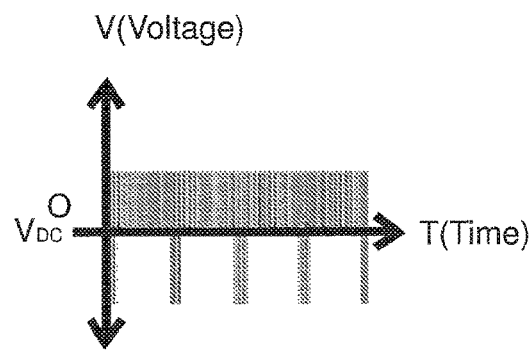
FIG. 7A to 7D are schematic views of third exemplary wave forms of the superimposed time-varying frequency electromagnetic wave.
Figure 7B:
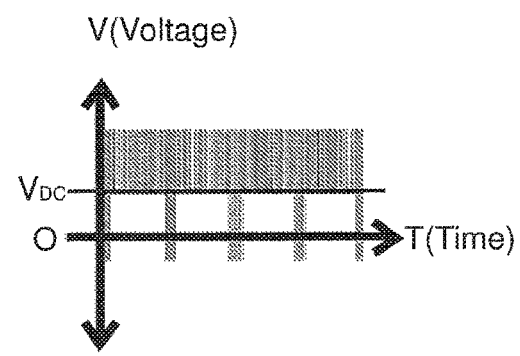
Figure 7C:
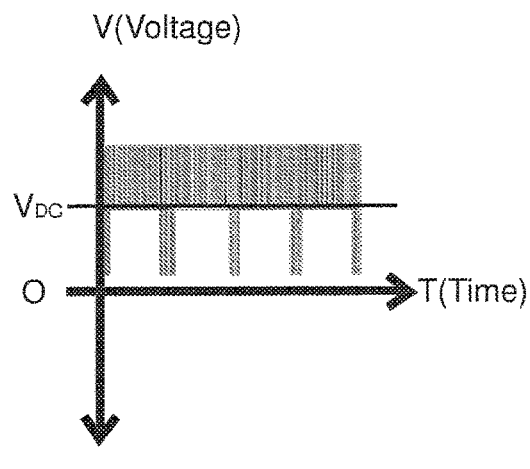
Figure 7D:
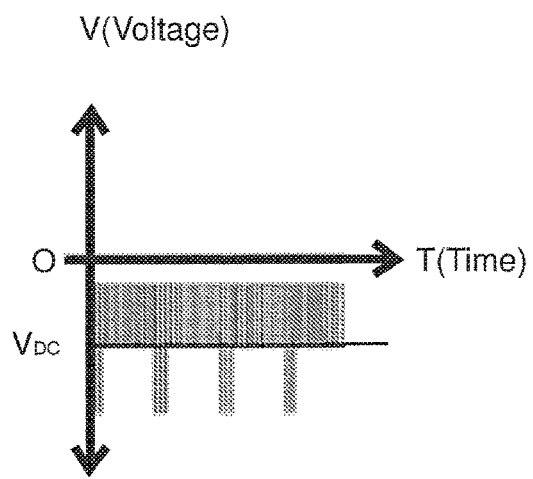

When the input DC signal is provided to the AC wave generator 112, the generator 112 generates and amplifies an AC driving signal corresponding to the time-varying frequency AC electromagnetic wave at a specific sweeping time, which is a wave for example in sine wave form (see FIGS. 5A to 5C). The amplified AC driving signal of the time-varying frequency AC alternating electromagnetic wave is delivered to the DC biasing unit 116 where the DC bias output having a predefined a bias voltage $V_{DC}$ is mixed with the AC driving signal. The result of such a mix is an AC-DC superimposed signal where the time-varying AC electromagnetic wave is riding on the DC preset level to produce the superimposed time-varying frequency electromagnetic wave (hereinafter called "DAC wave") having a mixed-frequency voltage. In the DAC wave, the DC component is not static but rather travels in a pulsating and time-varying manner along with the AC component. Therefore, there will be a pulsing ionic wave current containing the DC component produced in the liquid 130, i.e. there are physical ions or charges flowing in the liquid 130, which is an important and distinguishing feature of the invention. After being subject to such an ionic wave current, the internal energy including the vibrational and rotational energy of the liquid is changed, which results in the liquid molecule clusters carrying electrons or positive charge. This can change the clustering arrangement of the liquid molecule, and more importantly, the energy can be stored in the liquid for a period of time before it is completely dissipated to the surroundings. The stored energy in the liquid plays an important role for the various treatment effects.

In some cases, it is necessary to control the DAC wave to have a controllable DC superimposition magnitude. For example, when the DAC wave is applied for bio-fouling control purposes, the DC biasing voltage $V_{DC}$ may be set such that the DC superimposition magnitude can be controlled to vary between −60 V to +60 V in continuous variations or in steps, and of course higher voltage can be applied. In general the maximum limit of the DC imposition magnitude is determined by safety operating limits and is controlled to be less than the pulsating wave peak voltage. The negative and positive polarity may be set permanently or be controlled by switching the terminal polarity at a pre-programmed frequency or manually.

The polarity of the DAC wave is characterized mainly by the DC component and depends on the polarity of the DC component and the overall loop power source current flow direction. The average voltage of the DAC wave can be seen as having two components, one being the AC amplitude and the other being the DC bias voltage. Each of these magnitudes has its own function, but also they often provide a synergy effect to each other. In some scenarios, a large AC voltage amplitude is necessary, for example to deter the bio-organism attachment. In other scenarios, the DC magnitude (i.e. the DC bias voltage) is important, for example in providing sufficient current density covering the structure surfaces to be protected in corrosion control to meet the full corrosion protection criteria. Also, the ratio of AC to DC amplitudes is important in some applications such as controlling the types of disinfectant effect produced. High DC magnitude can generate more long residual time disinfectant whereas the high AC magnitude can produce more short life disinfectant. Therefore, the AC amplitude voltage and the DC bias voltage may be adjusted and selected according to the actual applications required of the DAC wave.

In a preferred embodiment of the invention, the polarity of the DAC wave may be changed asymmetrically as shown in FIGS. 5A to 5C. In FIG. 5A the DAC sine wave never goes negative, in FIG. 5C the DAC sine wave never goes positive, and in FIG. 5B the DAC sine wave spends more time positive than negative. One of the methods for changing the polarity of the DAC wave is to configure the DC biasing unit to give different DC bias voltages $V_{DC}$ so that the polarity of the DAC sine wave may be varied, if desired.

Figure 8A:
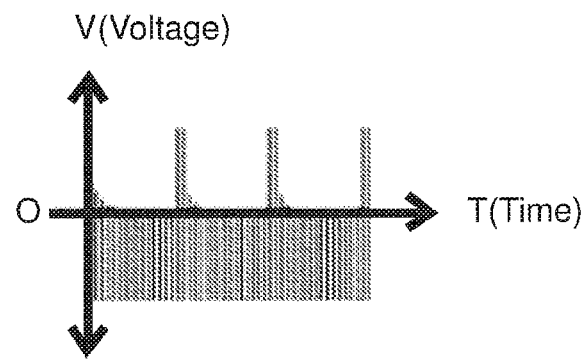
FIG. 8A to 8C are schematic views of fourth exemplary wave forms of the superimposed time-varying frequency electromagnetic wave.
Figure 8B:
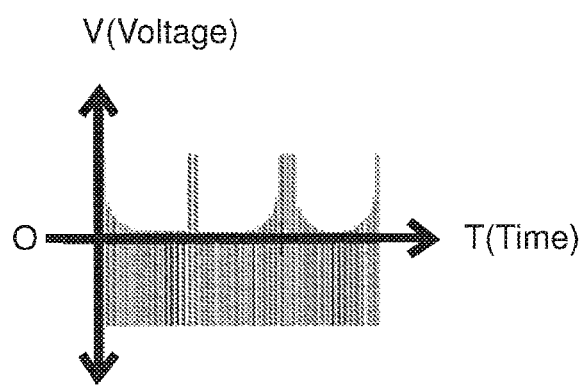
Figure 8C:
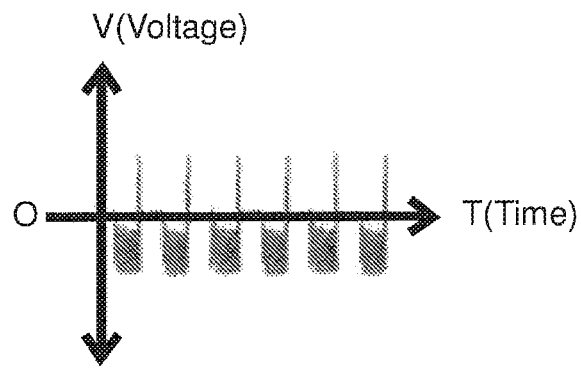

Non-sine waveforms are possible for the invention, for example square waves, rectangular waves, triangular waves or the like. FIGS. 6A to 6D and FIGS. 7A to 7D illustrate some possible variations of the waveforms. In certain applications of the DAC wave, such as when the DAC wave is applied to water in order to prevent bio-fouling, using a distorted waveform instead of a regular waveform can result in a better effect for bio-organism control. It is believed that the bio-organisms find it difficult to adapt to the changes in waveform and hence a more effective disinfection result can be realized. In FIGS. 8A to 8C, there are illustrated some examples of wave distortion. The distorted wave may be obtained by filtering diodes or filter circuits; or the AC wave generator may be programmed to produce many other possible distorted waveforms.

Figure 2:
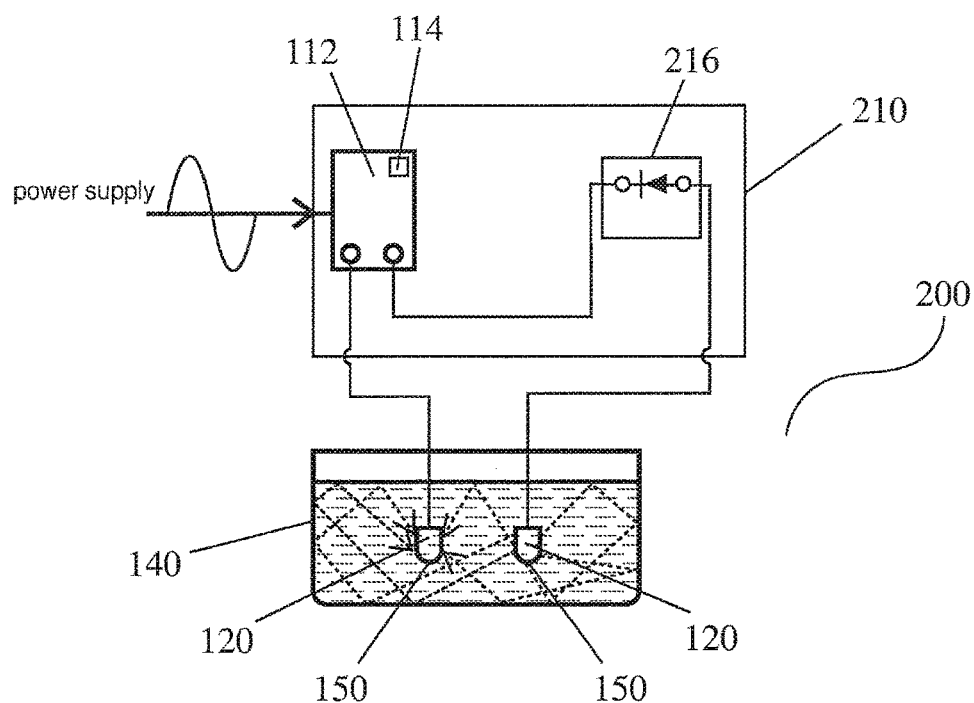
FIG. 2 is a schematic view of an exemplary arrangement of a superimposed time-varying frequency electromagnetic wave system which is constructed in accordance with a second embodiment of the invention.

Now turning to FIG. 2, there is illustrated a system 200 constructed consistent with a second embodiment of the present invention. The system 200 of this embodiment is structurally same as the one shown in the first embodiment above, except that an inductive diode filter 216 is selected as the DC biasing unit. The inductive diode filter 216 functions to filter all or part of the positive or negative half of the time-varying frequency AC electromagnetic wave to yield an asymmetrical wave having only positive components or negative components. In this embodiment, the DAC wave is biased to have an amplitude toward only the positive or negative direction and generate the waveforms as shown in FIGS. 9A and 9B.

Figure 3A:
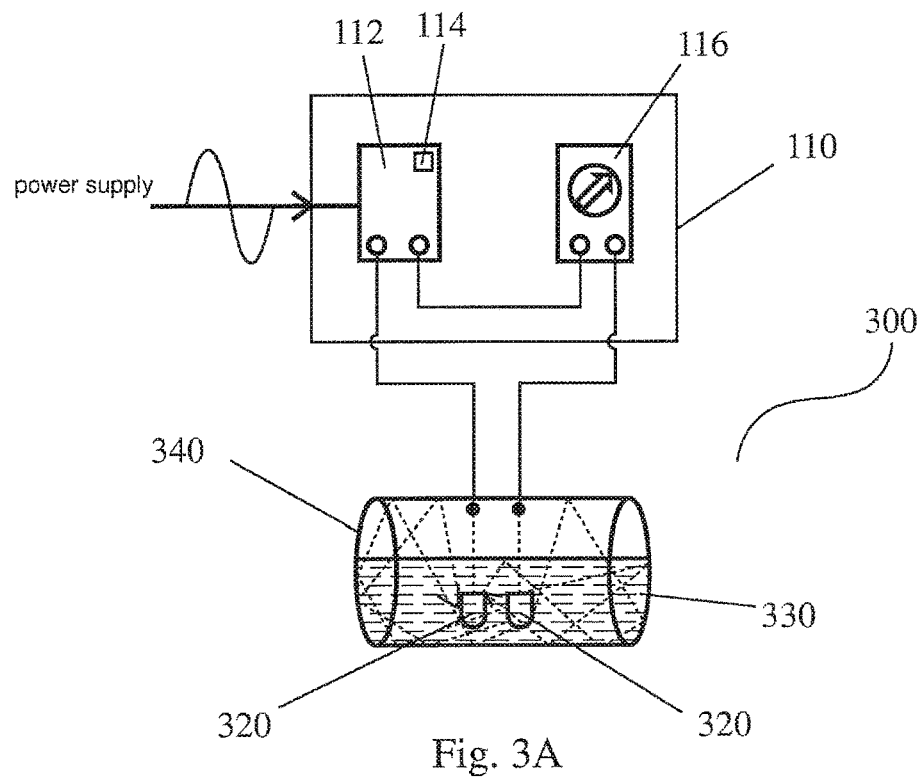
FIGS. 3A and 3B are a schematic view of an exemplary arrangement of a superimposed time-varying frequency electromagnetic wave system which is constructed in accordance with a third embodiment of the invention.
Figure 3B:
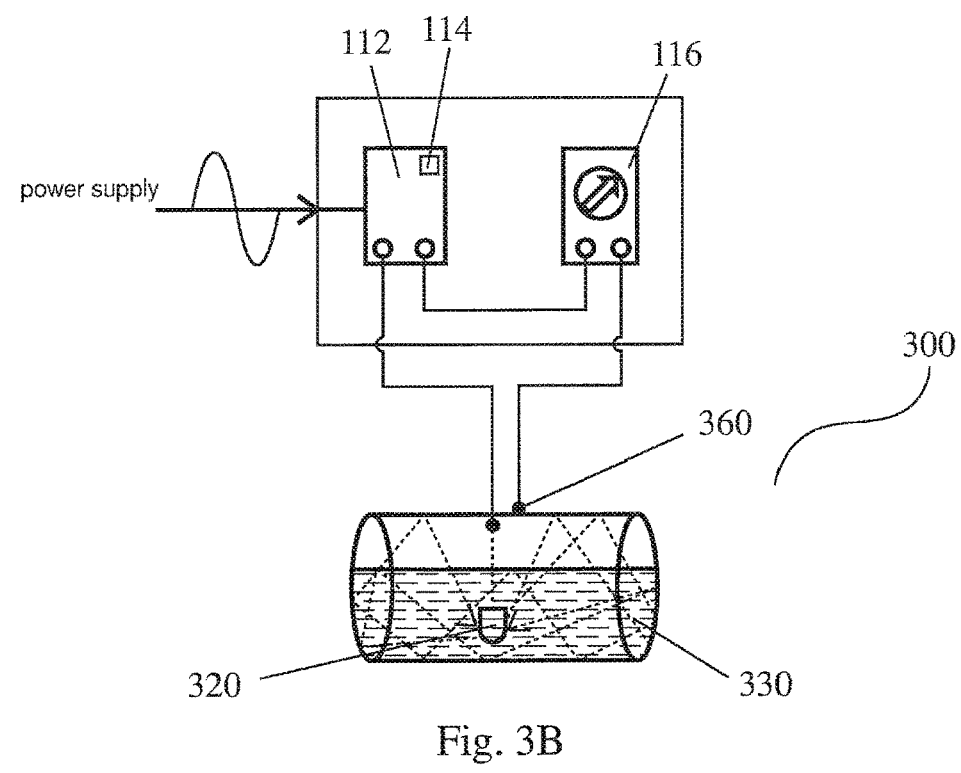

FIGS. 3A and 3B illustrate a system 300 constructed consistent with a third embodiment of the present invention. The system 300 of this embodiment is structurally the same as the one shown in the first embodiment above, except that the pipe 340 and the fluid such as water 330 flowing in the pipe 340 together form a target region to be treated. In FIG. 3A, the pipe 340 is made of a non-metallic material so the two actuators 320 are placed to connect with the first and second excitation sites located in the fluid. An inductor may be arranged to connect with the one of the excitation sites, if needed, to enhance the electromagnetic effect. In FIG. 3B, the pipe 340 is made of a metallic material. In this case, one actuator 320 is placed in the fluid. The other excitation site is positioned on the pipe 340 itself, and this excitation site is directly electrically coupled with the output terminal of the device for generating the DAC wave. The DAC wave can go randomly towards different directions in the liquid 330 and in the pipe 340, which ensures that many blind spots or zones in the liquid and in the pipe can be reached by the DAC wave and therefore are subject to the DAC wave treatment. In some extreme hard to reach blind spot or zone cases, an extra connection point 360 may be provided at the blind spot areas to force the return of the DAC wave.

Figure 4A:
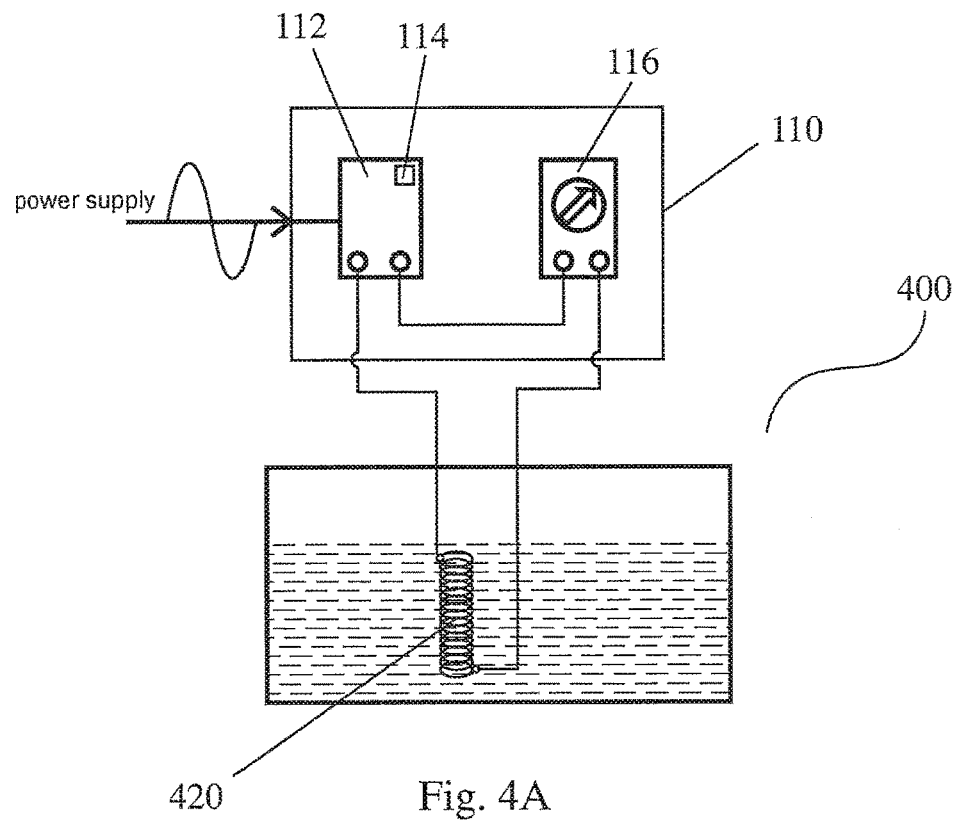
FIGS. 4A and 4B are a schematic view of an exemplary arrangement of a superimposed time-varying frequency electromagnetic wave system which is constructed in accordance with a fourth embodiment of the invention.
Figure 4B:
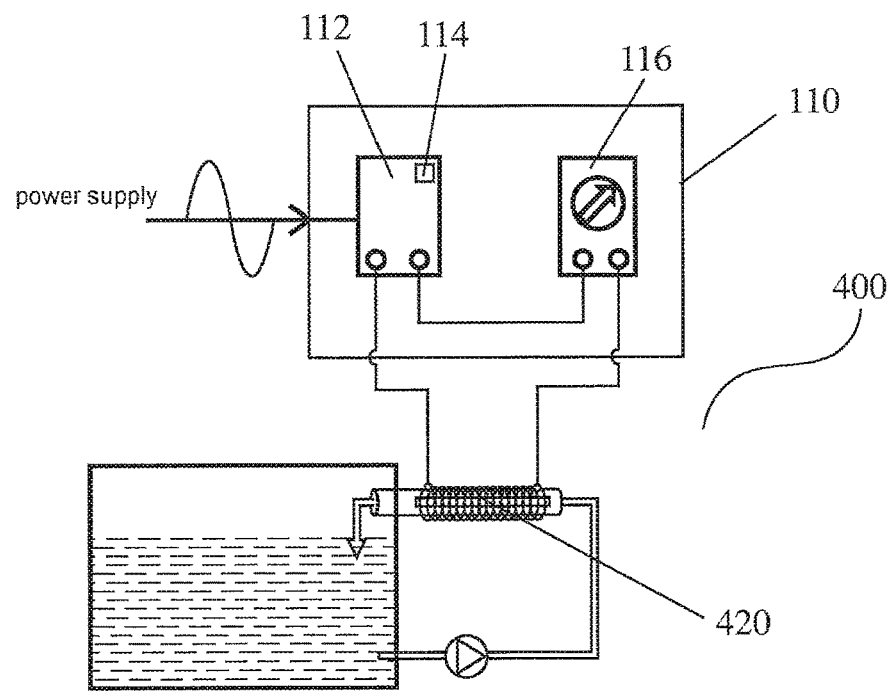

FIGS. 4A and 4B illustrate a system 400 constructed consistent with a fourth embodiment of the present invention. The system 400 of this embodiment is structurally the same as the one shown in the first embodiment described above, except that the actuators are provided in the form of a coil 420 to excite the target region. Ferrite may be incorporated within the coil or outside the coil to enhance the magnetic field effect. Likewise, the coil 420 may be immersed in the liquid (FIG. 4A) or above the liquid (4B).

In the method of the invention, the actuator may be placed in the water. The location of the actuator may be a long distance from the structure such that the potential gradient created in the electrolyte is minimal. When the actuator is placed "remotely" from the structures or vice versa, the DAC wave will be able to distribute evenly across the entire structure surface, providing a uniform and complete protection effect.

The systems discussed in the above embodiments can produce the required DAC wave uniquely. The right system can be chosen for a specific application for the desired treatment effect.

The present invention provides a specific application of the time-varying DC pulsating wave described above for treatment of ballast water and ballast water treatment systems.

FIGS. 11 and 12 illustrate alternative embodiments of the present invention. It should be noted that the elements shown in each embodiment are interchangeable with the elements illustrated in any other embodiment. FIG. 11 shows the effect of the system with a non-metallic housing structure or a steel (or other metal) housing with non-metallic inner lining and FIG. 12 shows the effect for a metallic housing without a non-metallic lining structure.

In this invention, as shown in FIGS. 11 and 12, the time-varying DC pulsating wave disinfection system is used on ballast water 330 that is passed into the treatment system via a mechanical separation means 500. Pre-separation of particles and organisms of >50 µm in a major length dimension is carried out using mechanical separation means 500 which can be any suitable means such as a strainer, cyclone or filter. It is anticipated some bio-organisms of >50 µm may be able to pass through the separators 500 but the majority shall be removed in the filtering separation process. An UV unit positioned in the process flow after the separators 500 may be incorporated and will not affect the system performance. Such addition may be considered as an optional feature of the invention.

The DC biased time-varying pulsating wave is generated by a DAC wave generator 110. A power supply source 501 provides power to a ULF wave generator 110, typically rectified from a 230V/440V, 50/60 Hz AC power supply. The wave generator 110 comprises a time-varying DC pulsating wave generator consisting of an electronic circuit board which converts the incoming rectified DC current into an alternating time-varying modulated low frequency wave as output. The DC superimposing can be done by a variety of means, for example by using a variable output DC switch mode power supply or rechargeable DC battery as indicated by reference 610 in FIG. 12 or an inductive diode filter as indicated by reference 510 in FIG. 11, which create a similar treatment effect to an asymmetrical DC superimposed pulsed time-varying wave but do not require any additional DC power source.

FIG. 11 illustrates an arrangement for a non-conductive material housing 540, in which two emitters 520 are positioned within the housing 540 in the ballast water 330. FIG. 12 illustrates an arrangement for a metallic or conductive material housing 640, in which one emitter 620 is positioned within the housing 640 in the ballast water 330 and the other emitter 660 is positioned on the metallic housing 640 itself.

The emitters 520, 620 that are placed in the ballast water preferably consist of semi- or non-consumable materials such as graphite, or may comprise, for example, a silicon chromium iron, a conductive carbon or conductive carbon coated substrate, a metal oxide coated substrate, or a platinum coated titanium or a diamond doped substrate.

The corresponding emitter 520, 660 that receives the net DC pulsed time-varying wave can be made of any metallic material or conductive non-metallic material. For a metallic housing 640, the housing itself may be used as the net DC wave receiving emitter 660.

The number of emitters or emitter pairs may be multiplied in series or separately depending on the treatment efficacy requirement. The frequency and strength of the emitter pairs may also be controlled separately to meet the specific frequency range requirement of different organisms.

When using a non-metallic housing 540, as shown in FIG. 11, a good avalanche current can be produced concurrently. In the case of a non-metallic housing 640, as shown in FIG. 12, a non-conductive material lining may be provided (not shown) to improve the production of avalanche current. However, a metallic housing 640, of a material such as steel, will also receive a corrosion protection effect similar to cathodic protection by production of a magnetite protection layer generated by the emitter excitation energy.

FIGS. 11 and 12 show inductor coils 570 to control the output current. However, alternatively, a Pulse Width Modulation technique may be incorporated in the DAC wave generator circuit design and can then be used to control the output current, output waveform design, the pulsing frequency, the frequency range, the sweeping frequency and the voltage applied.

The DC biased time-varying pulsating wave generated by the DAC wave generator 110 has several important characteristics. The pulsating wave has a controllable DC superimposition magnitude which, for all practical purposes, can be controlled to vary between −60 V to +60 V in continuous variations or in steps, although higher voltages can be applied. In general the maximum limit of the DC imposition magnitude is determined by safety operating limits and also controlled to less than the pulsating wave peak voltage. The negative and positive polarity may be set permanently or may be controlled by switching the terminal polarity either at a pre-programmed frequency or manually.

As discussed above, the basic waveforms of a DC superimposed time-varying frequency wave can be of square, triangular, sine or other random form and the final output of the DC superimposed time-varying frequency wave can be in any one of the combinations shown in FIGS. 5 to 9.

The DC biased time-varying pulsed wave can be produced by an asymmetrical ULF wave or by use of inductive diode filters, conventional diodes or filtering circuits. When the ULF wave is asymmetrical or offset, the time varying AC wave will become a DC biased wave. The same filtering or rectifier components may also be used or added separately to create spikes in the waveform to enhance the disinfection performance.

The DC superimposition for the present invention can be provided by any one of the following methods:
1. Using a Switch Mode DC power supply or other AC to DC rectifiers power supply with variable or fixed output voltage.
2. If using inductive diode filters, the DC imposition is achieved by filtering all or part of the positive or negative half of the AC wave amplitude hence biasing the wave amplitude toward only the positive or negative direction.
3. A rechargeable DC battery can also be used for DC superimposition purpose, in place of the inductive diode filter or the DC.
4. By using a specific circuitry design to produce a desired asymmetrical AC pulsed time-varying wave.

The pulsating wave frequency range may be from 100 Hz to 1 MHz, and is preferably between 0.1 kHz to 200 kHz.

The sweeping frequency of the pulsating frequency range may be any value between 1 and 1000 Hz.

As discussed above, when the system is installed in a metallic piping or housing system 640, the metallic housing can be used as the wave returning emitter 660.

As discussed above, the wave emitting emitter 620 materials may also be chosen from consumable or non-consumable materials. If a consumable material is chosen, such as magnesium or aluminum anodes, this provides the added advantage of not producing chlorine.

A further aspect of this invention comprise the use of a new composite electrode using steel rod wrapped with $MgCO_3+MgO$ or other alkali materials which provides an alkaline environment will be able to produce an in situ generated magnetite layer on the steel anode surface. Such an electrode has been used with DC current to generate the magnetite but this has the disadvantage that $Fe_2O_3$ is often produced before the magnetite production. As a result, the steel rod will still be consumed and the objective of forming a permanent electrode is hard to achieve. In the present invention, the steel rod is energized with the DC biased time-varying pulsating wave and, due to the presence of the pulsating wave instead of a static DC current, the magnetite is able to form very effectively on the steel rod, due to the higher energizing energy effect from the pulsating wave. To further enhance the magnetite formation, the steel rod may first be pre-energized using a DC biased time varying wave by connecting it to a temporary wave emitting emitter. When the steel rod receives DC biased time varying wave current from the temporary wave emitting emitter in the $MgO+MgCO_3$ alkaline environment, a magnetite layer will form readily on the steel rod. After forming the magnetite, the steel rod is disconnected from its position as a wave returning emitter and it can then be used as a long-lasting permanent magnetite emitter.

The use of consumable, semi-consumable or permanent wave emitter and returning emitters, and combinations in the treatment system can be arranged in many possible arrangements or modified as required to suit various onsite conditions. In general, the wave emitter and returning emitter assembly can be part of the usual piping system of the treatment system or they can be arranged in a separate wave emitter/returning emitters chamber.

In the system and methods of the invention, TRO in the water is controlled or mitigated by the DC superimposition amount. The DC superimposition control may be controlled manually or via an automatic TRO concentration feedback controller to suit ballast water treatment requirements or other applications.

There are many situations when a ship has to navigate in water with unknown sudden changes in conductivity such as navigating from fresh water to sea water and vice versa. Under such circumstances there will be sudden changes in conductivity such that the current output may increase drastically when navigating in high conductivity water or the output current will be too low when the ship is in a fresh water river or lake. Conventionally, a constant current transformer may be used to control the current. However, the constant current transformer regulates the current output by varying the voltage and in the situation of high conductivity seawater, the voltage will need to drop to only a few volts compared with a high of, say, 48V in fresh water to avoid over-current. This is because seawater conductivity can be as high as 50 ms/cm and fresh lake water can have a conductivity of as low as 0.1 ms/cm. When the voltage drops to a low of only a few volts, it is too low and insufficient to create the organism kill effect. Similarly, if a maximum current is set to accommodate the maximum current under high salinity conditions, then in fresh water conditions the voltage is maintained at maximum but the current is too low to create the kill effect, due to the constant current transformer rectifier control function.

To overcome the above problem, in this invention, a Pulse Width Modulation method may be used. In this embodiment, the predetermined "effective kill voltage and current" are first set into the program for the lowest conductivity condition. When the conductivity increases, the pulse band width is reduced to reduce the current root mean square value yet the voltage is maintained constant. In this way, the organisms in the water will be subjected to the required voltage and current treatment and hence a good disinfection effect can be produced or maintained under all kinds of water conditions.

For all the embodiments of the invention the generation of the time-varying DC pulsating wave is as described above and consists of superimposing a direct current on a low frequency time-varying pulsating electromagnetic wave signal. The low frequency time-varying electromagnetic wave can be in sine, square, triangular or even in random form. However, the frequency range preferably operates in the range from 100 Hz to 1 MHz and varies with a sweeping frequency of 1 to 1000 Hz. The selection of the range of frequency and also the sweeping frequency will be determined by the fluid quality, flow rate, and treatment purpose.

The invention thus provides a system and a method for applying a superimposed time-varying frequency electromagnetic wave to ballast water and ballast water treatment systems which is very simple, relatively inexpensive, and more environmentally sound. Most importantly, it meets the USCG requirement yet with a relatively low power consumption which is available on board ship without the need to install an additional generator.

Preferences and options for a given aspect, feature or parameter of the invention should, unless the context indicates otherwise, be regarded as having been disclosed in combination with any and all preferences and options of all other aspects, features and parameters of the invention.

While the embodiments described herein are intended as exemplary systems and methods, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

The invention claimed is:

1. A method of treating ballast water containing aquatic organisms, comprising applying a superimposed time-varying frequency AC electromagnetic wave to the ballast water, the method comprising the steps of:
   generating the superimposed time-varying frequency AC electromagnetic wave in which an AC driving signal with time-varying frequency is riding on a DC output with a predefined DC bias voltage to form a net superimposed DC biased time-varying pulsating AC electromagnetic wave;
   transmitting the net superimposed DC biased time-varying pulsating AC electromagnetic wave to one or more emitters, the emitters being configured to transmit the net superimposed DC biased time-varying pulsating AC electromagnetic wave, and
   subjecting the ballast water to the net superimposed DC biased time-varying pulsating AC electromagnetic wave so as to excite the ballast water and the aquatic organisms therein,
   wherein the excitation causes a flow of ionic current having a DC component travelling in a pulsating and time-varying AC manner in the ballast water and resident aquatic organisms which induces a vibration of electrons and molecules therein that acts to kill the said aquatic organisms to prevent biofouling.

2. The method of claim 1 wherein the method includes the steps of:
   supplying rectified DC power to an ultra-low frequency (ULF) wave generator,
   generating an alternating time-varying modulated low frequency pulsating wave from the rectified DC power, and
   superimposing the alternating time-varying modulated low frequency pulsating wave to form the net superimposed DC biased time-varying pulsating AC electromagnetic wave.

3. The method as claimed in claim 1, comprising the further step of passing the ballast water through a mechanical filtration process or UV unit prior to treatment by the net superimposed DC biased time-varying pulsating AC electromagnetic wave.

4. The method as claimed in claim 1, wherein the emitters are contained in a housing and the ballast water is passed through the housing.

5. The method as claimed in claim 4, wherein the housing is a metallic or conductive material and one emitter is provided in the ballast water and a further emitter is provided on the housing.

6. The method as claimed in claim 4, wherein the housing is a non-metallic or non-conductive material and at least one pair of emitters is provided in the ballast water.

7. The method as claimed in claim 1, wherein the frequency of the superimposed time-varying frequency electromagnetic wave is between about 100 Hz and about 1 MHz.

8. The method as claimed in claim 7, wherein the frequency of the superimposed time-varying frequency AC electromagnetic wave is between about 0.1 KHz and about 200 KHz.

9. The method as claimed in claim 1, wherein the superimposed time-varying frequency AC electromagnetic wave has a sweeping frequency between about 1 Hz and about 1 KHz.

10. The method as claimed in claim 9, wherein the superimposed time-varying frequency AC electromagnetic wave has a sweeping frequency between about 10 Hz and about 500 Hz.

11. The method as claimed in claim 1, wherein the generated net superimposed DC biased time-varying pulsating AC electromagnetic wave is a DC biased alternating current having fixed frequency, time-varying frequency or random.

12. The method as claimed in claim 1, wherein at least one emitter comprises a steel rod coated with $MgO+MgCO_3$ or other alkali material to create an alkaline environment and the net superimposed DC biased time-varying pulsating AC electromagnetic wave enables a magnetite layer to form on the steel rod.

13. The method as claimed in claim 1, wherein the net superimposed DC biased time-varying pulsating AC electromagnetic wave output current is controlled by use of an inductor coil.

14. The method as claimed in claim 1, wherein the net superimposed DC biased time-varying pulsating AC electromagnetic wave output current is controlled by a pulse width modulator.

15. A ballast water treatment system comprising:
   a power supply for supplying power to an alternating time-varying modulated low frequency pulsating wave generator,
   a device for generating a superimposed time-varying frequency AC electromagnetic wave and having at least two output terminals, the device comprising an alternating current (AC) wave generator for generating an AC driving signal of AC electromagnetic wave having a time-varying frequency at a desired sweeping time, and a direct current (DC) biasing unit electrically coupled in series with the AC wave generator and for producing a DC output with a predefined DC bias voltage, the DC biasing unit being configured such that the DC output is mixed with the AC driving signal to produce a superimposed DC biased time-varying pulsating AC electromagnetic wave in which the time-varying frequency AC wave is riding on the predefined DC bias voltage, and an emitter provided at one or each of a first excitation site and a second excitation site in the ballast water or in the ballast water and the ballast water treatment system and electrically coupled in series with the output terminal of the device, for transmitting the superimposed DC biased time-varying pulsating AC electromagnetic wave to ballast water containing aquatic organisms, wherein the device is electrically coupled in series with the first excitation site and the second excitation site of the ballast water or in the ballast water and the ballast water treatment system directly or through the emitter, such that the superimposed DC biased time-varying pulsating AC electromagnetic wave is applied to the ballast water or in the ballast water and the ballast water treatment system, and wherein the DC bias output and the AC driving signal are superimposed such that the superimposed DC biased time-varying pulsating AC electromagnetic wave is able to induce a flow of ionic current having a DC component travelling in a pulsating and time-varying manner in the ballast water and resident aquatic organisms or in the ballast water and resident aquatic organisms and the ballast water treatment system and effect induced vibration of electrons and molecules therein to kill the said aquatic organisms to prevent biofouling.

16. The system as claimed in claim 15, wherein the DC biasing unit is selected from the group consisting of switch mode DC power supply, an AC to DC converter, a rechargeable DC battery and an inductive diode filter.

17. The system as claimed in claim 15, wherein the DC bias voltage is selected such that the superimposed time-varying frequency AC electromagnetic wave is produced to have polar asymmetry or become a unidirectional pulsating wave.

18. The system as claimed in claim 15, wherein the frequency of the superimposed time-varying frequency AC electromagnetic wave is between about 100 Hz and about 1 MHz, and the sweeping frequency of the superimposed time-varying frequency AC electromagnetic wave is between about 1 Hz and about 1 kHz.

19. The system as claimed in claim 15, wherein both the first and second excitation sites are positioned in the ballast water in a spaced relation, or one of the first and second excitation sites is positioned on the ballast water treatment system, and the other is positioned in the ballast water.

20. The system as claimed in claim 15, wherein at least one emitter comprises a steel rod coated with $MgO+MgCO_3$ or other alkali material to create an alkaline environment and the DC biased pulsating electromagnetic wave enables a magnetite layer to form on the steel rod.

* * * * *